United States Patent [19]
Kanatani et al.

[11] Patent Number: 4,727,641
[45] Date of Patent: Mar. 1, 1988

[54] THERMOPLASTIC METHOD OF REDUCING THE DIAMETER OF A METAL TUBE

[75] Inventors: Fumiyoshi Kanatani, Kobe; Shigetomo Matsui, Higashiosaka; Toshio Atsuta; Takeshi Yamada, both of Kobe; Eisuke Mori, Tokyo; Toshiaki Araki, Kobe, all of Japan

[73] Assignee: Kawasaki Jukogyo Kabushiki Kaisha, Hyogo, Japan

[21] Appl. No.: 871,917

[22] Filed: Jun. 6, 1986

[30] Foreign Application Priority Data

| Jun. 7, 1985 | [JP] | Japan | 60-122663 |
| Sep. 10, 1985 | [JP] | Japan | 60-198633 |
| Sep. 10, 1985 | [JP] | Japan | 60-198634 |
| Sep. 10, 1985 | [JP] | Japan | 60-198635 |
| Sep. 10, 1985 | [JP] | Japan | 60-198636 |

[51] Int. Cl.⁴ ............................................. B23P 11/02
[52] U.S. Cl. .................................... 29/447; 29/455 R; 72/342
[58] Field of Search .................. 72/342, 367; 29/447, 29/455 R

[56] References Cited

U.S. PATENT DOCUMENTS

| 2,227,476 | 1/1941 | Williams et al. | 72/342 |
| 2,309,181 | 1/1943 | Franck | 72/342 |
| 2,428,825 | 10/1947 | Arnoldy | 72/342 |
| 2,480,774 | 8/1949 | Rossheim et al. | 72/342 |
| 4,449,281 | 5/1984 | Yoshida et al. | |

FOREIGN PATENT DOCUMENTS

| 24015 | 8/1970 | Japan. | |
| 152328 | 9/1982 | Japan. | |
| 998078 | 2/1983 | U.S.S.R. | 29/447 |

Primary Examiner—Lowell A. Larson
Attorney, Agent, or Firm—Wenderoth, Lind & Ponack

[57] ABSTRACT

For reducing the diameter of any axially limited part of a metal tube, that part is heated externally by an annular heater while at least the adjacent part or parts of the metal tube are being cooled and held at a temperature sufficiently low to limit the free thermal expansion of the heated part. On cooling, the part that has been heated becomes less in diameter than the other portions of the metal tube. The complete length of the metal tube can likewise be reduced in diameter by moving the annular heater and the metal tube relative to each other in the longitudinal direction of the tube from one end to the other while at least the adjacencies of the part being heated are being cooled as by water. The same method is adaptable for the fabrication of wear-resistant dual wall pipe for the transportation of fluids, as is also disclosed herein.

13 Claims, 15 Drawing Figures

THERMOPLASTIC METHOD OF REDUCING THE DIAMETER OF A METAL TUBE

BACKGROUND OF THE INVENTION

This invention concerns a novel method of thermoplastically reducing the diameter of metal tubes. The inventive method is of particular utility in conjunction with the manufacture of dual wall tubes or pipes, such as wear-resistant piping for the transportation of fluids therethrough, by reducing the diameter of the outer pipe member to shrink on the inner pipe member.

Pipelines constitute a major means of transportation of all sorts of fluids, as well as fluidized solids, in a wide variety of industries. Among the pipelined materials are the slurries (mixtures with water) of such solids as coal, minerals and cement. Finer solid particles such as dust and quartz sand are conveyed by air pressure. A problem encountered with the transportation of such fluidized solids is the abrasion and rapid wear of the inside of the pipe.

A known solution to this problem has been the use of cheap steel pipe of the class used as gas pipe. When worn out, such cheap pipe has been replaced with new one, or patches have been welded to the worn parts. However, in applications where resistance to wear is of utmost importance, pipe of more expensive material such as cast stainless steel of high chromium content has also been in use.

Generally, the wear resistance of steel materials depends in a large measure on their hardness. Highly wear resistant materials are invariably very hard. Some cast stainless steel used as a wear-resistant pipe material has a Shore hardness of as much as 81 or more. The higher the hardness, however, the lower is the ductility of the steel materials. Pipe cast from the noted stainless steel of high chromium content is susceptible to breakage under impact loading.

Additional weaknesses of hard, wear resistant steel materials are their poor weldability and machinability. Pipe sections made of such materials do not allow the welding of flanges thereto. Even if the pipe sections have flanges formed in one piece therewith, difficulties are encountered in boring, finishing or like subsequent machining of the flanges. Pipe repair by welding is also not easy. Still further the manufacturing costs are very high.

Recently, therefore, there has been suggested and used steel pipe having wearproof linings. Such lined pipe has been made by centrifugal casting or by buildup welding, with the linings metallurgically joined to the pipe proper. The pipe with the wearproof linings is far superior in wear resistance to, and thus has a much longer useful life than, the ordinary steel pipe. An additional advantage is that the pipe proper need not be wear resistant and so can be fabricated from sufficiently ductile, weldable materials. The use of such materials makes possible the provision of pipe that, unlike the one made solely from wear resistant materials, is sufficiently strong against impact loading and which allows the welding on of flanges.

Offsetting these advantages of steel pipe having wearproof linings is its susceptibility to cracking because the linings have residual tensile stresses regardless of the method of manufacture. The cracks that have developed in the linings are easy to propagate to the pipe proper, the latter being metallurgically joined to the linings as aforesaid.

What is currently believed to be the best substitute for the lined steel pipe is dual wall pipe consisting of two pipe members of different diameters nested one within the other. The outer pipe member is of a material having practically sufficient ductility whereas the inner pipe member is of a wearproof material. The outer and inner pipe members should not be metallurgically joined to each other but should be self tightened, that is, in contact under pressure, with the inner pipe member under compressive stress. Such dual wall pipe possesses the same advantages as, and is free from the disadvantages of, the above described lined pipe.

Three methods have so far been suggested for the fabrication of the self tightened dual wall pipe. The first is to thermally shrink the outer pipe member onto the inner member; the second is to hydraulically expand the inner member against the outer member; and the third is to thermally expand the outer member and hydraulically expand the inner member against the outer member. All these known methods have the following drawbacks.

The first method requires the inside diameter of the outer pipe member and the outside diameter of the inner pipe member to be machined to very stringent tolerances. However, if the inner pipe member is of a wear resisting material and so is very hard, its machining to the required dimensional tolerances is difficult. The manufacture of elongate dual wall pipe of constant contact pressure is also very difficult by this method.

The second and third methods are analogous in that the inner pipe member is plastically expanded in diameter against the outer member. In the case of dual wall pipe in which the inner pipe member has very high yield strength and is thick, extremely high pressures are required for the diametral expansion of the inner pipe member so that both of these methods are unpractical. In the second method (the hydraulic expansion of the inner member against the outer member) in particular, the inner member has a higher yield strength than the outer member, so that the plastic expansion of the inner member is inevitably followed by some difference in elastic contraction between the two members, resulting in the creation of a gap between the inner and outer members.

A further weakness of the second and third methods is that they are adoptable only in cases where the inner pipe member is metal made. Ceramics have recently been proposed as materials for the inner member of dual wall pipe by virtue of their strength, lightness, and resistance to wear and corrosion. Ceramics are of course nonexpansible, either hydraulically or thermally.

Thus, despite the strong demands expressed by the various industries for dual wall pipe with a wear resisting capability, no truly satisfactory method of manufacture has so far been available.

SUMMARY OF THE INVENTION

The present invention is based upon the discovery of a novel method of reducing the diameter of a metal tube or pipe, either in part or in whole. The inventive method lends itself to, among other applications, the manufacture of various types of dual wall pipe of wearresistant construction for fluid transportation without the above discussed difficulties encountered heretofore.

Stated in its perhaps broadest aspect, the method of this invention comprises externally heating annular part of a metal tube while at least adjacent part of the tube is being held at a temperature sufficiently low to limit the free thermal expansion of the annular part being heated. Then the annular part of the metal tube is caused to cool down. On cooling, the annular part of the metal tube that has been heated becomes less in diameter than before the heating.

It is to be noted that the complete or any extensive length of the metal tube is not heated at one time; instead, only its part of a limited axial dimension is heated at one time while at least the adjacent part or parts of the metal tube is being cooled. The concurrent heating and cooling of the tube is essential for the reduction of its diameter by the method of this invention. The invention should therefore be clearly distinguished from the known methods of increasing or decreasing the diameter of tubes or pipes by simply heating or cooling it. The thermoplastic mechanism involved in the radial contraction of metal tubes in accordance with the invention will be discussed in the subsequent detailed description.

The inventive method is readily adaptable for the reduction of the diameter of a complete length of metal tube or pipe. Toward this end there may be held around the metal tube an annular heater capable of applying localized heat to any annular part of the metal tube having a limited dimension in its axial direction. The metal tube and the annular heater may be moved relative to each other in the axial direction of the tube for successively heating the tube throughout the length thereof, while at the same time at least part of the tube adjacent to the annular part is being cooled to limit the free thermal expansion of the annular part being heated. Thus, on cooling, the tube has its complete length reduced in diameter.

Obviously, then, the inventive method is further adaptable for the fabrication of self tightened dual wall pipe of wear or corrosion resistant construction for the transportation of fluids or fluidized solids. Inner and outer pipe members of desired materials may be nested together. There can initially be some clearance between the nested pipe members. Then the outer pipe member may be reduced in diameter by the above method to shrink on the inner pipe member, thereby forming a tight interference fit between the two pipe members.

Unlike the known methods of thermally or hydraulically expanding the inner pipe member against the outer pipe member, the method of this invention is free from the possibility of any undesired clearance being left between the pipe members. Also, since no such excessive force is required as that needed by these conventional methods for expanding the inner pipe member, the invention makes possible the manufacture of dual wall pipe of any required length at reduced costs.

The invention further offers a definite advantage over the prior art method of shrinking on, in that less dimensional accuracies are required for the mating surfaces of the inner and outer pipe members as they are initially nested together. The fabrication of elongate dual wall pipe is therefore much easier than heretofore.

Further, since only the outer pipe member undergoes a change in diameter in the fabrication of dual wall pipe by the method of this invention, the inner pipe member can be of any desired material in addition to metal. Thus, for example, the inner pipe member may be of ceramics, which are now mass producible at reduced costs and which are highly wear and corrosion resistant.

It is an additional advantage of this invention that the inventive method is applicalbe to the manufacture of either straight or curved dual wall pipe. The fabrication of curved dual wall pipe having a ceramic inner pipe member is also possible.

The above and other features and advantages of this invention and the manner of realizing them will become more apparent, and the invention itself will best be understood, from a study of the following description and appended claims, with refernece had to the attached drawings.

DETAILED DESCRIPTION OF THE INVENTION

Figure 1:
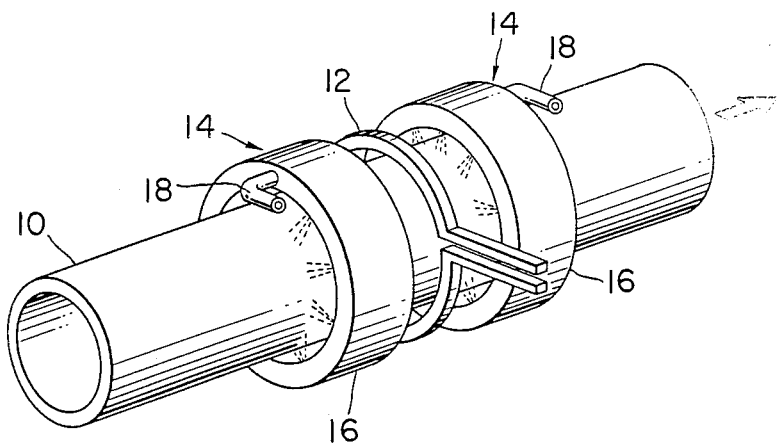
FIG. 1 is a perspective view diagrammatically illustrating a typical arrangement for reducing the diameter of metal tube or pipe by the method of this invention.

The principles underlying the method of this invention will be best understood from a study of the typical arrangement of FIG. 1 for the practice of the method. The metal tube or pipe 10 has its desired part of a limited axial dimension loosely and concentrically surrounded by an annular heater 12 which typically takes the form of a high frequency induction heater. At least one, preferably two, annular coolers 14 also loosely surround the tube 10 in concentric relation thereto. The illustrated two annular coolers 14 are disposed adjacent the annular heater 12 and on its opposite sides in the axial dimension of the tube 10. Each annular cooler 14 is herein shown as a coolant sprayer, having a hollow, perforated ring 16 communicating with a source, not shown, of a coolant under pressure by way of a conduit 18. The coolant to be sprayed can be service water.

Figure 2:
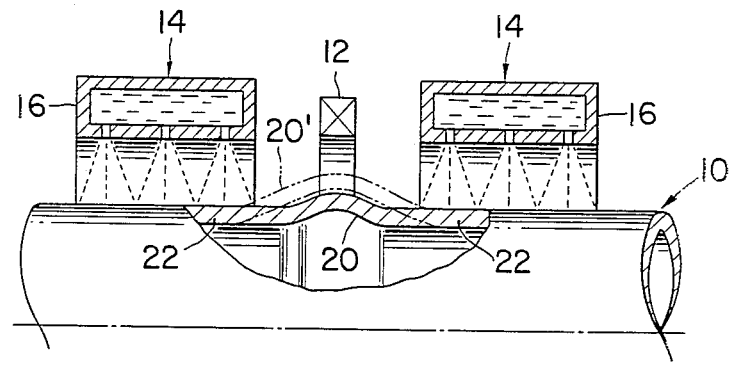
FIG. 2 is a partial axial section, partly in elevation, through the arrangement of FIG. 1, the view being explanatory of the way in which part of the metal tube or pipe is thermoplastically reduced in diameter by the method of this invention.

The method of this invention dictates the concurrent heating and cooling of the metal tube 10. Heated circumferentially by the annular heater 12, the part of the metal tube 10 tends to expand radially outwardly. However, since the neighboring parts of the metal tube are being cooled by the water sprays from the annular coolers 14, and since the part being heated is of a limited axial dimension, this latter part of the metal tube will not expand so much as if the neighboring parts were not cooled. The dashed lines designated 20' in FIG. 2 indicates the extent to which the heated part 20 of the metal tube 10 would expand if the neighboring parts 22 were not cooled simultaneously. Actually, however, the cooled neighboring parts 22 of the metal tube 10 will limit the thermal expansion of its heated part 20 to the extent depicted by the solid lines in FIG. 2.

Figure 3:
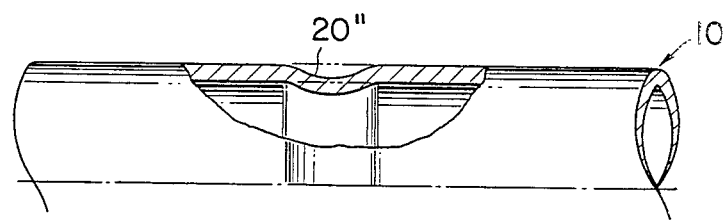
FIG. 3 is a partial elevation, partly sectioned axially for clarity, of the metal tube or pipe which has been partly reduced in diameter by the arrangement of FIGS. 1 and 2.

Generally, the yield strength of metals decreases when they are heated. The heated part 20 of the metal tube 10 has a reduced yield strength or, more simply, is softened. As the heated part 20 is expanded while being prevented from free expansion by the cooled neighboring part 22, the part 20 is subjected to yielding, whereby, on cooling, the part 20 will contract not to the initial diameter but to a smaller diameter, as indicated at 20" in FIG. 3.

Figure 4:
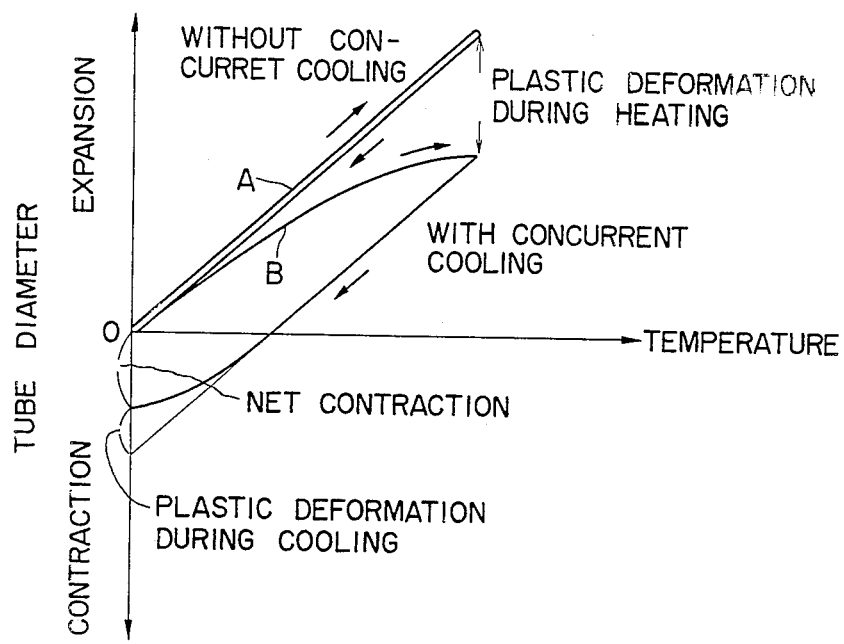
FIG. 4 is a graph explanatory of how the diameter of metal tube or pipe is reduced by the method of this invention.

FIG. 4 is a graphic summary of the foregoing thermoplastic process by which the tube 10 is reduced in diameter in accordance with the invention. As indicated by the curve A in this graph, the tube diameter will increase linearly with increase in temperature, and will decrease linearly with decrease in temperature, if the neighboring regions of the tube are not cooled during the heating of its limited part. The tube diameter will be the same before and after the heating.

The curve B in the same graph indicates changes in the diameter of the part 20 of the metal tube 10 that has been treated as above by the method of this invention. It will be seen that the diameter does not increase linearly with temperature because of some plastic deformation during the heating. Such plastic deformation also takes place during the cooling of the metal tube part 20, but on completion of cooling the diameter becomes appreciably less than that before the heating.

The thermal expansion of the heated part of the metal tube may not necessarily be limited by simultaneously cooling its axially adjacent parts but also by simultaneously cooling the radially inward portion of the part being heated. All that is required by the method of this invention is that there be a sufficient temperature gradient in any direction in the metal tube to limit the free expansion of the part being heated.

Figure 5:
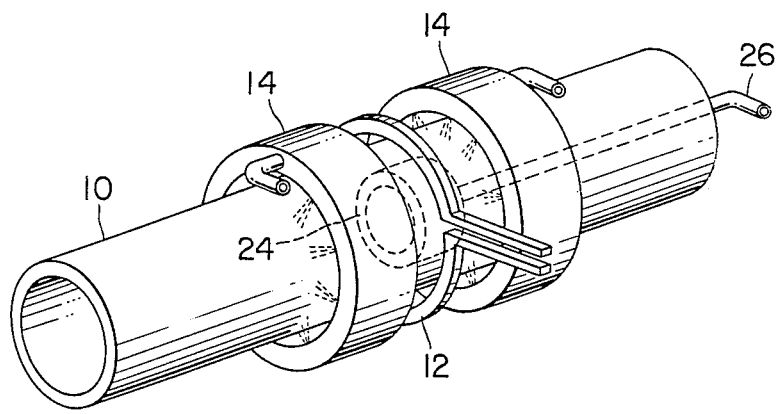
FIG. 5 is a perspective view diagrammatically illustrating an alternative arrangement for reducing the diameter of metal tube or pipe by the method of this invention.
Figure 6:
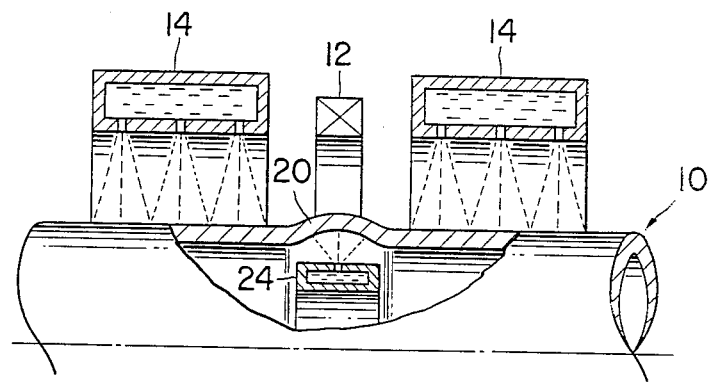
FIG. 6 is a partial axial section, partly in elevation, through the alternative arrangement of FIG. 5, the view being explanatory of the way in which part of the metal tube or pipe is reduced in diameter by the method of this invention.

Thus, in an alternative arrangement shown in FIGS. 5 and 6, an additional cooler 24 is disposed within the metal tube 10, approximately in a position of radial registry with the annular heater 12. The above mentioned pair of annular coolers 14 are disposed externally of the metal tube 10 and on both sides of the annular heater 12, surrounding the tube as in the arrangement of FIG. 1. The inside heater 24 can also be a water sprayer in the form of a hollow, perforated ring communicating with a source of water under pressure, not shown, by way of a conduit 26.

As the required part 20 of the metal tube 10 is heated externally by the annular heater 12, water may be sprayed from the collers 14 and 24 on the axially adjacent parts of the metal tube and on the inside of the heated part 20. The forced cooling of The inside of the part 20 being heated serve not only to limit its free expansion but also to impart a residual compressive stress to the inside of the part 20 upon its cooling down. The heated part 20 will become reduced in diameter, as in FIG. 3, on being cooled subsequently.

The invention as so far described has been limited to the reduction of the diameter of only part of the metal tube 10, with the heater 12 and coolers 14 (and 24) fixed with respect to the tube. Cooled by the coolers 14, the axially neighboring parts 22 of the metal tube 10 restrain the part 20 from undergoing any great reduction in diameter. For reducing the diameter of the complete length of the metal tube 10, either this tube or the heater 12 and coolers 14 may be moved relative to the other 10 in the axial direction of the tube, as indicated by the arrow in FIG. 1. The resulting contraction of the metal tube 10 will be greater than when only its limited part is processed as above, because then the tube is gradually liberated from residual stresses created in its successive treated parts.

Figure 7:
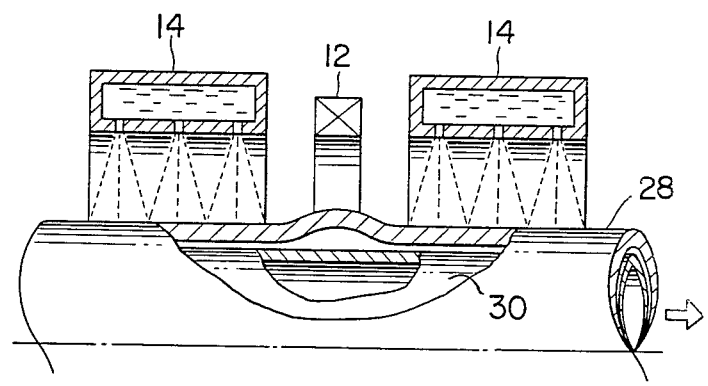
FIG. 7 is a view similar to FIG. 2 except that the method is applied to the fabrication of dual wall pipe from two nested pipe members.

Reference is now directed to FIG. 7 for a discussion of the inventive method as adapted for the fabrication of dual wall pipe of wearproof construction for the transportation of slurries or fluidized solids. this figure shows two pipe members 28 and 30 of different diameters nested together. There can initially be some clearance between the nested pipe members 28 and 30 for the ease of insertion of the inner pipe member 30 in the outer pipe member 28. The outer pipe member 28 is made of, for instance, low carbon steel of high ductility, with a carbon content of, say, 0.25%. The inner pipe member 30 is made of, for instance, quench hardened high carbon steel with a carbon content of, say, 0.55%.

Figure 8:
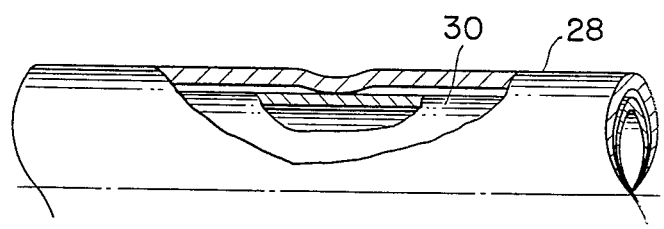
FIG. 8 is a partial elevation, partly sectioned axially for clarity, of the nested pipe members of FIG. 7, showing part of the outer pipe member reduced in diameter into a tight interference fit with the inner pipe member.

With the annular heater 12 and the pair of annular coolers 14 held around the two loosely nested pipe members 28 and 30 as in the arrangement of FIG. 1, the pipe members may be jointly moved axially relative to the heater and coolers, as indicated by the arrow. Heated by the heater 12, any axial part of the outer pipe member 28 will temporarily expand radially to an extent limited by the cooling of its axially neighboring parts by the coolers 14, as depicted in FIG. 7 and as has been explained with reference to FIG. 2. Since the nested pipe members 28 and 30 are constantly travelling axially relative to the heater 12 and coolers 14, the heated and radially expanded part of the outer pipe member 28 will subsequently be cooled by the trailing one of the two coolers with respect to their movement relative to the pipe members and so will contract into contact with the inner pipe member 30 as in FIG. 8.

Thus, with the travel of the complete length of the nested pipe members 28 and 30 through the heater 12 and coolers 14, the outer pipe member 28 will contract radially throughout its length into contact with the inner pipe member 30.

It should be appreciated that the above reduction of the diameter of the outer pipe member 28 by the method of this invention takes place irrespective of the thickness or material of the inner pipe member 30 and of the axial dimension of the two pipe members. The method is therefore very well suited for the fabrication of elongate dual wall pipe having a thick, wearproof inner pipe member.

It is also to be noted that the provision of the two annular coolers 14 is not of absolute necessity. Only one annular cooler could be provided, and disposed on the trailing side of the annular heater 12 with respect to the direction of the axial displacement of the pipe members 28 and 30 relative to the heater and cooler, for the successful shrinking on of the outer pipe member in accordance with the method of this invention.

In some instances, however, the outer pipe member 28 may not shrink into a desired degree of tight interference fit with the inner pipe member 30 by a single stroke of axial movement of the pipe members relative to the heater 12 and coolers 14. The degree of shrinkage depends upon the diameter, thickness and material of the outer pipe member. The initial clearance between the nested outer and inner pipe members is subject to change depending upon their length. The longer the pipe members to be nested, the greater must be the initial clearance therebetween. If a single shrinkage treatment of the outer pipe member is insufficient, the pipe members 28 and 30 may be fed through the heater 12 and coolers 14 any required number of strokes until the desired interference fit is obtained.

Figure 9:
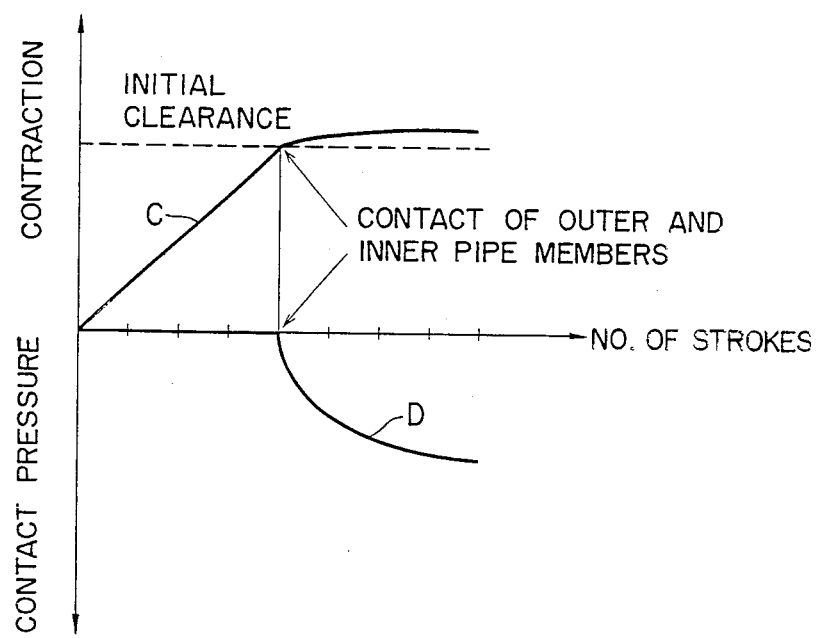
FIG. 9 is a graph explanatory of how the outer pipe member is reduced in diameter into an interference fit with the inner pipe member in the fabrication of the dual wall pipe by the method of this ivnention.

As has been ascertained by experiment and as represented by the curve C in the graph of FIG. 9, the diameter of the outer pipe member 28 decreases linearly with the increasing number of pipe strokes through the heater 12 and coolers 14 as long as there is a clearance left between the pipe members. In the particular example represented by this graph, the contact between the inner and outer pipe member 28 is established on the fourth stroke of the pipe members. The outer pipe member further shrinks, although to significantly less extents, as the pipe members are further treated by the same method thereafter. The curve D in this graph indicates the increasing contact pressure between the two pipe members as the same treatment is repeated several times following the establishment of contact therebetween.

Figure 10:
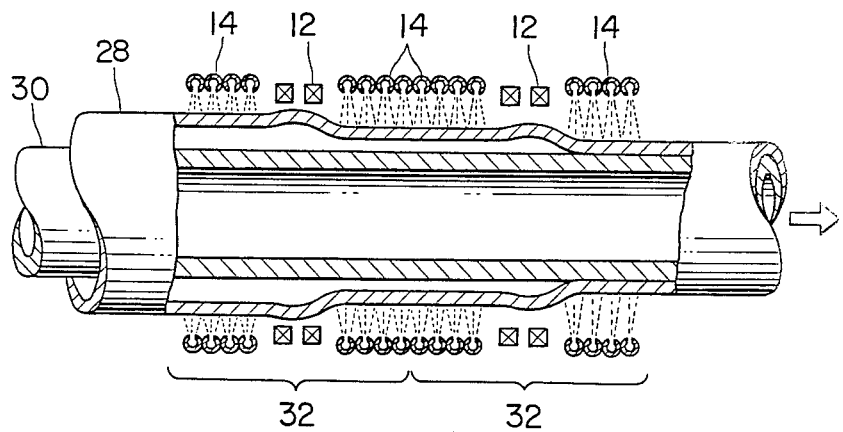
FIG. 10 is a partial axial section, partly in elevation, through a modified arrangement for the fabrication of dual wall pipe by the method of this invention.

The required number of treatments can be drastically reduced by providing a plurality of annular heaters and a plurality of annular coolers in alternate arrangement as in FIG. 10. Preferably, and as pictured in this figure, one annular heater 12 and two annular coolers 14 on its opposite sides may be combined in axial alignment to form one heater and cooler assembly 32. A plurality of, two in this particular embodiment, such heater and cooler assemblies 32 may be further combined in axial alignment, one of the coolers of each assembly held against one of the coolers of the adjoining assembly.

As shown also in FIG. 10, the loosely nested pipe members 28 and 30 may be fed axially in the arrow marked direction through the above combination of the heater and cooler assemblies 32. As the nested pipe members 28 and 30 traverse the two heater and cooler assemblies 32 one after the other, the outer pipe member 28 will shrink in two steps, in each of which it undergoes the above explained thermoplastic process in accordance with the invention. The resulting total degree of shrinkage of the outer pipe member 28 is of course greater than in cases where only one heater and cooler assembly is employed.

Of course, any desired number of heater and cooler assemblies 32 may be combined in order to cause the outer pipe member to shrink into tight interference fit with the inner pipe member with the single stroke of the pipe members through the combination of the heater and cooler assemblies. The provision of several heater and cooler assemblies in series necessitates the consumption of less power for the relative axial displacement of the nested pipe members and the heater and cooler assemblies. The control of the operation will also be easier as a much shorter length of time is required for the establishment of the interference fit between the nested pipe members.

As has been stated, the invention calls for the heating of any axially limited part of tube or pipe at one time while at least some other part of the tube or pipe is being cooled at the same time. By the phrase "at least" is meant that the tube or pipe may be substantially wholly cooled during the heating of its part.

Figure 11:
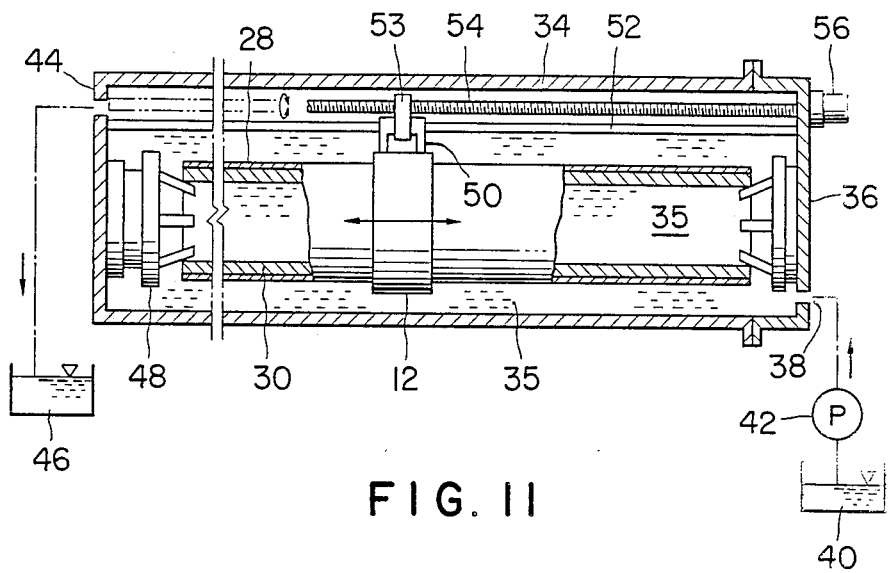
FIG. 11 is a vertical section, partly in elevation and partly shown broken away for clarity, through a further modified arrangement for the fabrication of dual wall pipe by the method of this invention.

Thus, in an arrangement illustrated in FIG. 11, the nested pipe members 28 and 30 are thoroughly submerged in a coolant bath for shrinking the outer pipe member 28 against the inner pipe member 30 by the method of this invention. At 34 is shown a horizontally elongated vessel for containing a liquid coolant 35, usually water, having an openable cover 36 at one end. The coolant vessel 34 has a coolant supply port 38 in communication with a coolant reservoir 40 via a pump 42, and a drain port 44 in communication with another reservoir 46.

The loosely nested pipe members 28 and 30 to be processed are supported within the coolant vessel 34 by a pair of pipe holders 48 which are mounted to the insides of the opposite ends of the coolant vessel for engaging the opposite ends of the pipe members. As the coolant 35 is constantly pumped into the vessel 34 through the supply port 38 and overflows therefrom through the drain port 44, the nested pipe members 28 and 30 are thoroughly immersed in the coolant. Not only the outer pipe member 28 but also the inner pipe member 30 is constantly exposed to the coolant 35.

The annular heater 12 loosely surrounds the nested pipe members 28 and 30, so that the coolant 35 fills the space therebetween. The heater 12 has a bracket 50 thereby to be slidably mounted to a guide rod 52 extending parallel to the pipe members 28 and 30. The bracket 50 has mounted thereto a worm 53 in mesh with a threaded rod 54 rotatably supported within the coolant vessel 34 and coupled to a motor drive unit 56.

As the motor drive unit 56 is set into rotation, the annular heater 12 will travel linearly along the guide rod 52, applying localized heat to successive axial parts of the outer pipe member 28 from one end to the other. Since the complete outer pipe member 28 is immersed in the coolant 35, and since this coolant is being constantly renewed, all but the axially limited part being heated of the outer pipe member is cooled to a uniform temperature. The outer pipe member 28 will thus be shrunk to hold the inner pipe member 30 under constant pressure at all parts.

The cooling of the inner pipe member 30 by the coolant 35 during the foregoing process of the radial contraction of the outer pipe member 28 serves a very useful purpose if the inner pipe member has previously been quench hardened by way of wearproofing. The coolant serves to prevent the quenched inner pipe member 30 from being annealed, so to say, enabling the inner pipe member to retain its wear resisting capability after having been combined with the outer pipe member 28 into dual wall pipe.

An additional advantage of the FIG. 11 arrangement is that, as the inner pipe member 30 retains its circular cross sectional shape, all parts of the outer pipe member 28 will shrink uniformly against the inner pipe member, with the consequent development uniform compressive stresses in all parts of the inner pipe member. The inner pipe member 30 will thus become resistant not only to wear but also to fracture by virtue of the uniform distribution of compressive stresses therein.

Possibly, however, the coolant existing as aforesaid between annular heater 12 and nested pipe members 28 and 30 in the FIG. 11 arrangement may impede the efficient heating of the outer pipe member 28 by the heater. In that case an annular air nozzle, not shown, may be mounted to the bracket 50 so as to loosely surround the pipe members 28 and 30 and to travel with the annular heater 12 axially of the pipe members. Air or like gas under pressure may be expelled from the unshown nozzle to that part of the outer pipe member 28 being heated, in order to remove the coolant 35 from the outside of the heated part of the outer pipe member as far as possible. As the annular heater 12 moves on with the air nozzle, the coolant will immediately flow back into contact with the part of the outer pipe member 28 that has just been heated, thereby immediately cooling that part to cause its contraction.

As will be readily understood, the teachings of FIG. 11 can be combined with those of FIG. 10. The several annular coolers 14 employed in FIG. 10 are unnecessary for processing the nested pipe members in complete immersion in the coolant bath as in FIG. 11. Therefore, instead of the single annular heater 12 shown in FIG. 11, two or more such annular heaters may be slidably mounted to the guide rod 52 within the vessel 34, with axial spacings between the heaters. The operation of the resulting apparatus, as well as the advantages accruing therefrom, is considered self evident from the foregoing description of FIGS. 10 and 11.

In the fabrication of dual wall pipe by the method of this invention, it is only the outer pipe member that undergoes a thermoplastic change in diameter. The inner pipe member can be of materials other than metal since its diameter need not change.

Figure 12:
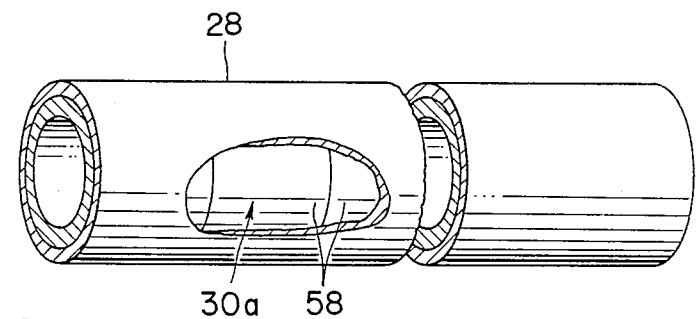

In FIG. 12, therefore, dual wall pipe is constructed from a steel outer pipe member 28 and a ceramic inner pipe member 30a. More specifically, the outer pipe member 28 is of low carbon steel of high ductility, with a carbon content of approximately 0.25%. The inner pipe member 30a is of alumina ceramic, which is very hard and highly wear resistant. The ceramic inner pipe member 30a is not an integral body but comprises a plurality or multiplicity of tubular ceramic segments 58 of short axial dimension held endwise against one another in axial alignment.

Figure 13:
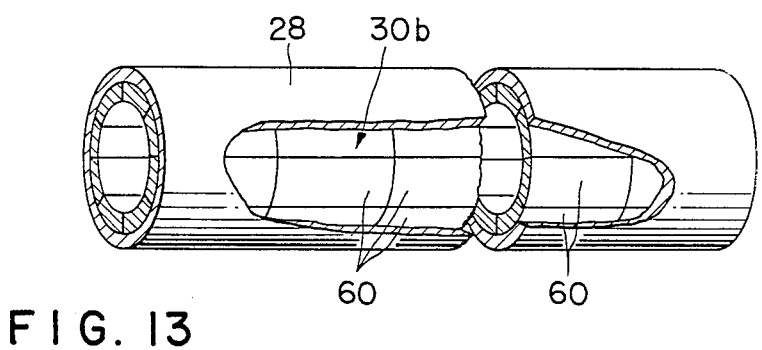
FIG. 13 is a view similar to FIG. 12 but showing another different example of dual wall pipe fabricated by the method of this invention.

FIG. 13 shows a ceramic inner pipe member 30b of alternative construction comprised of a multiplicity of generally rectangular, curved ceramic segments 60 held against one another in both circumferential and axial directions to form a tubular body within the steel outer pipe member 28.

As will be readily understood, the nested pipe members 28 and 30a of FIG. 12 and the nested pipe members 28 and 30b of FIG. 13 can both be tightened into dual wall pipe by the method of this invention and by any of the several different means set forth in the foregoing for the practice of the inventive method. As the outer pipe member 28 is sufficiently reduced in diameter, the ceramic segments 58 or 60 are retained in position with respect to one another under compressive stresses from the outer pipe member. The compressive stresses further serve to close the seams between the ceramic segments 58 or 60 against fluid leakage and, still further, to improve the fracture resistance of the pipe.

It will also be appreciated that, held under compressive forces from the outer pipe member 28, the ceramic segments 58 or 60 are so dynamically stable that there is practically no possibility of accidental detachment under the working conditions of the dual wall pipe. The initial nesting of the pipe members 28 and 58, or 28 and 60, is easy. All these advantages combine to make possible the fabrication of ceramic lined pipe of considerable axial dimension.

Figure 14:
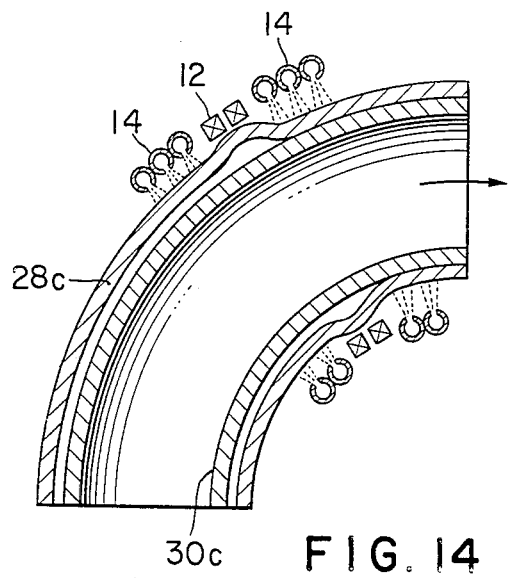
FIG. 14 is a partial axial section through an arrangement for the fabrication of an example of curved dual wall pipe by the method of this invention.
Figure 15:
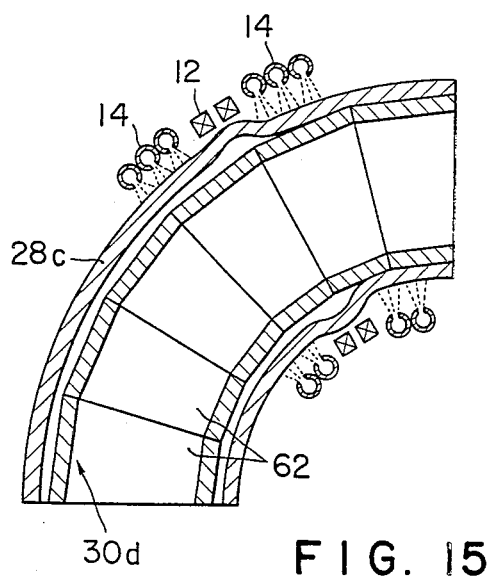
FIG. 15 is a view similar to FIG. 14 but showing an arrangement for the fabrication of a different example of curved dual wall pipe by the method of this invention.

The method of this invention is further applicable to the fabrication of curved dual wall pipe as in FIG. 14 or 15. The curved dual wall pipe of FIG. 14 comprises an outer wall member 28c of low carbon steel and an inner wall member 30c of quenched high carbon steel. Both outer and inner wall members 28c and 30c are curved with approximately the same radius.

In the alternative construction of curved dual wall pipe shown in FIG. 15, the outer wall member 28c of low carbon steel is fitted over an inner wall member 30d of a ceramic material such as that composed principally of alumina. The ceramic inner wall member 30d comprises a row of substantially tubular ceramic segments 62, each of trapezoidal shape as seen in axial section as in this figure, which have been cut from straight tube. The ceramic segments 62 are held endwise against one another and, as required, may be temporarily united as by means of an adhesive, thereby forming the inner wall member 30d having approximately the same radius of curvature as the outer wall member 28c.

Loosely nested together, the pipe members 28c and 30c of FIG. 14, or the pipe members 28c and 30d of FIG. 15, may be fed through, for example, the annular heater 12 and the pair of annular coolers 14 on its opposite sides. The outer pipe member 28c will shrink into tight interference fit with the inner pipe member 30c or 30d through the thermoplastic process of this invention set forth already.

The curved row of trapezoidal ceramic segments 62 of FIG. 15 could of course be replaced by an array of generally rectangular ceramic segments, similar to those shown at 60 in FIG. 13, adjoining one another in both axial and circumferential directions to form a curved tube. Regardless of the shape of the individual ceramic segments, they will be firmly held together against fluid leakage by compressive forces from the curved outer pipe member 28c, just like the ceramic segments 58 and 60 of FIGS. 12 and 13.

Although the present invention has been shown and described hereinbefore in very specific aspects thereof, it is understood that the invention is not to be limited by the exact details of this disclosure. For example, metal tube or pipe may be shrunk against a solid core, rather than against the various inner pipe members disclosed herein, by the method of this invention.

What is claimed is:

1. A thermoplastic method of reducing the diameter of a metal tube, which comprises: holding around the metal tube an annular heater capable of applying localized heat to the annular part of the metal tube so as to cause softening thereof; moving the annular heater and the metal tube relative to each other in the axial direction of the metal tube for producing a travelling annular heated part of the metal tube throughout the length thereof; and cooling parts of the metal tube neighboring said annular heated part on the opposite sides thereof in the axial direction of the metal tube by using a pair of annular coolers surrounding the metal tube and disposed close to said annular heater on the opposite sides thereof so as to be movable with the annular heater, the cooling by the coolers being such as to hold said parts neighboring the annular heated part at a temperature sufficiently low to limit the free radially outward thermal expansion of the annular heated part and to cause yielding of the same, whereby the diameter of the metal tube on cooling is made less than that before the heating.

2. The method of claim 1 wherein the annular coolers cool by spraying a liquid coolant onto the metal tube.

3. The method of claim 1 wherein the annular coolers are moved in fixed relation to the annular heater.

4. The method of claim 1 wherein the metal tube is further cooled by a cooler disposed therein and moved with the annular heater relative to the metal tube for cooling the inside of the annular part of the metal tube being heated.

5. The method of claim 1 wherein the annular heater and coolers are moved relative to the metal tube throughout the length thereof a required number of times until the diameter of the metal tube is reduced to a required degree.

6. A thermoplastic method of reducing the diameter of a metal tube, which comprises holding around the metal tube a plurality of annular heaters spaced from each other in the longitudinal direction of the metal tube, each annular heater being capable of applying locatized heat to annular part of the metal tube, also holding around the metal tube a plurality of annular coolers disposed alternately with the annular heaters, simultaneously moving the annular heater and the annular coolers relative to the metal tube in the longitudinal direction of the latter for successively heating annular parts of the metal tube throughout the length thereof, those parts of the metal tube which are adjacent to the annular parts being heated being cooled by the annular coolers to a temperature sufficiently low to limit the free thermal expansion of the annular parts being heated, whereby the diameter of the metal tube on cooling is made less than that before the heating.

7. A method of fabricating dual wall pipe, which comprises:

providing outer and inner pipe members loosely nested together, at least the outer pipe member being metal; holding around the nested pipe members an annular heater capable of applying localized heat to the annular part of the outer pipe member; moving the annular heater and the nested pipe members relative to each other in the axial direction of the nested pipe members for successively heating the annular part of the outer pipe member throughout the length thereof for producing a travelling annular heated part of the outer pipe member; and cooling parts of the outer pipe member neighboring said annular heated part on the opposite sides thereof in the axial direction of the outer pipe member by using a pair of annular coolers surrounding the metal tube and disposed close to said annular heater on the opposite sides thereof so as to be movable with the annular heater, the cooling by the coolers being such as to hold said parts neighboring the annular heated part at a temperature sufficiently low to limit the free radially outward thermal expansion of the annular heated part and to cause yielding of the same, whereby the diameter of the outer pipe member on cooling is made less than that before the heating to shrink on the inner pipe member.

8. The method of claim 7 wherein the inner pipe member is of a ceramic material.

9. The method of claim 8 wherein the ceramic inner pipe member is composed of a plurality of tubular segments held endwise against, and in axial alignment with, one another.

10. The method of claim 8 wherein the ceramic inner pipe member is composed of a multiplicity of generally rectangular, curved segments held against one another in both circumferential and axial directions to form a tubular body.

11. The method of claim 7 wherein the nested pipe members are both curved.

12. The method of claim 11 wherein the inner pipe member is composed of a plurality of substantially tubular ceramic segments each of trapezoidal shape as seen in axial section, the ceramic segments being held endwise against one another to form a curved tubular body.

13. A thermoplastic method of reducing the diameter of a metal tube, which comprises:

holding around the metal tube an annular heater capable of applying localized heat to the annular part of the metal tube so as to cause softening thereof; moving the annular heater and the metal tube relative to each other in the axial direction of the metal tube for producing a travelling annular heated part of the metal tube throughout the length thereof; and cooling the metal tube by submerging the same entirely in a coolant bath, while the metal tube is being heated by said annular heater, the cooling by the coolant bath being such as to hold at least parts of the metal tube neighboring the annular heated part at a temperature sufficiently low to limit the free radially outward thermal expansion of the annular heated part and to cause yielding of the same, whereby the diameter of the metal tube is made less than that before the heating.

* * * * *